(No Model.) 4 Sheets—Sheet 2.
E. G. PARKHURST.
MAGAZINE BOLT GUN.
No. 599,287. Patented Feb. 15, 1898.
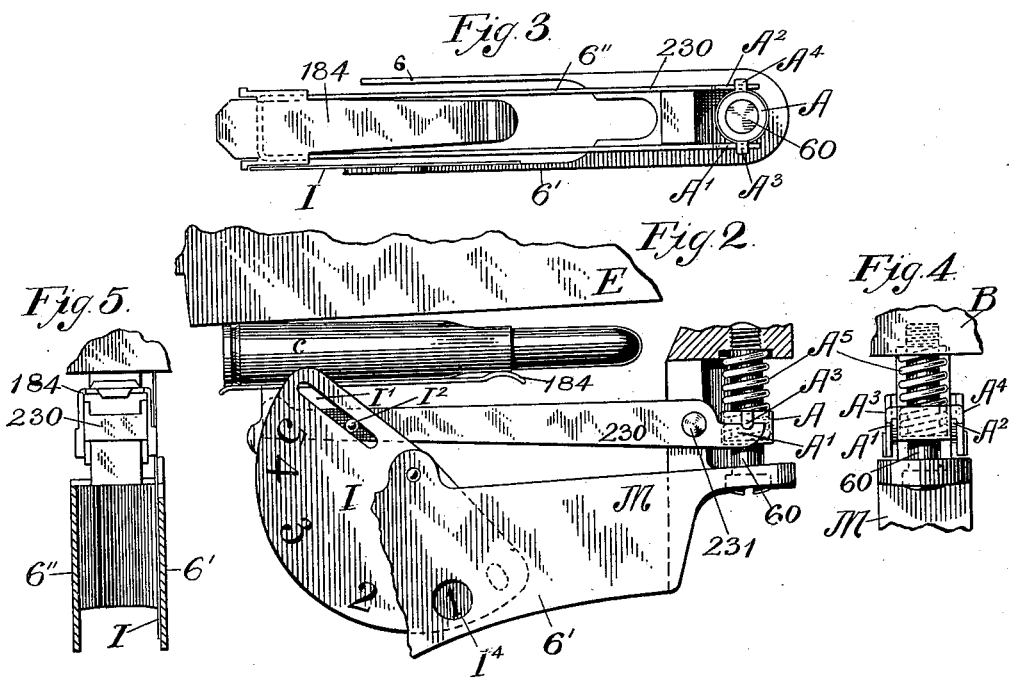
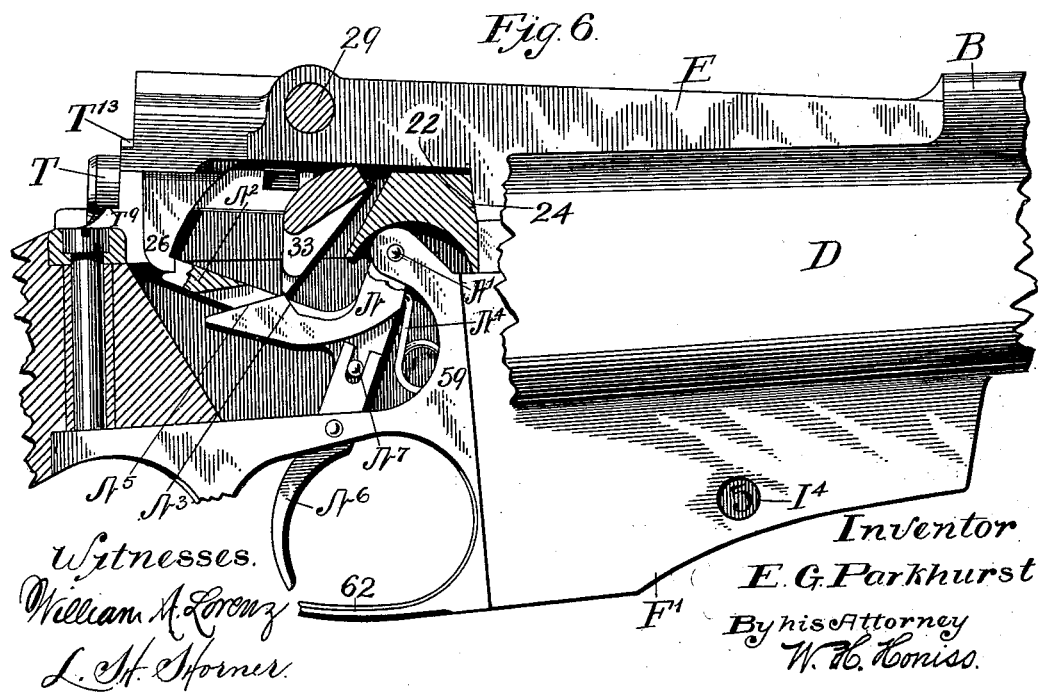
Witnesses.
William A. Lorenz
L. H. Horner
Inventor
E. G. Parkhurst
By his Attorney
W. H. Honiss (No Model.) 4 Sheets—Sheet 3.
E. G. PARKHURST.
MAGAZINE BOLT GUN.
No. 599,287. Patented Feb. 15, 1898.
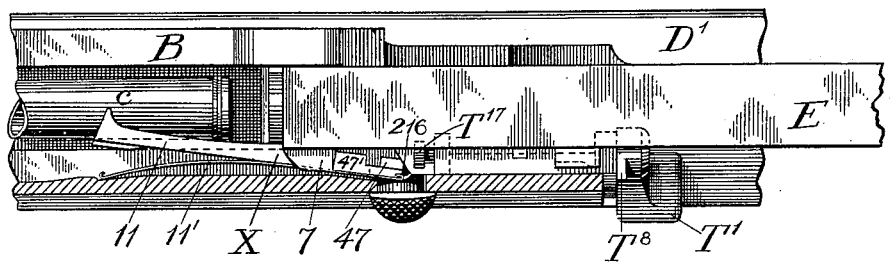
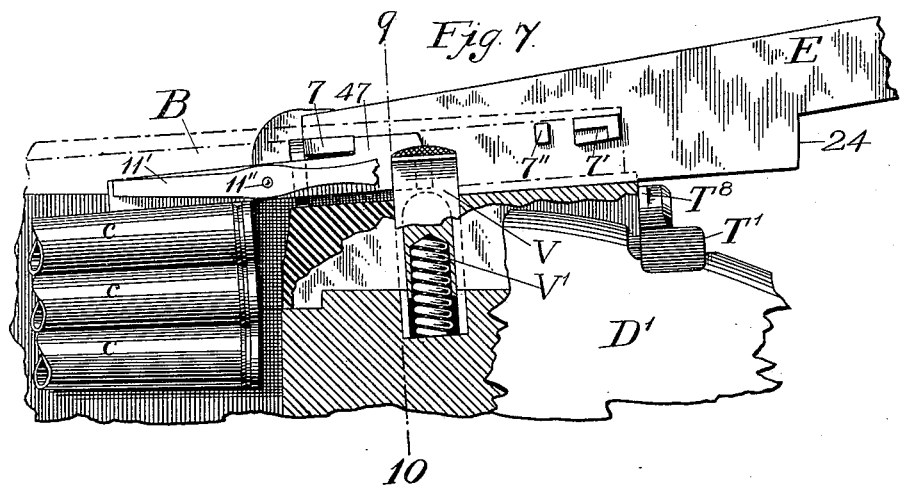
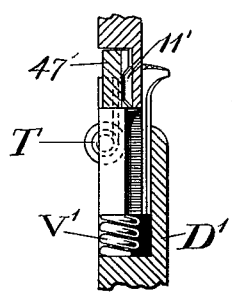
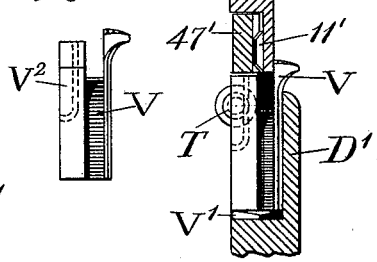
Witnesses.
William A. Lorenz
L. H. Horner
Inventor
E. G. Parkhurst
By his Attorney
W. H. Honiss

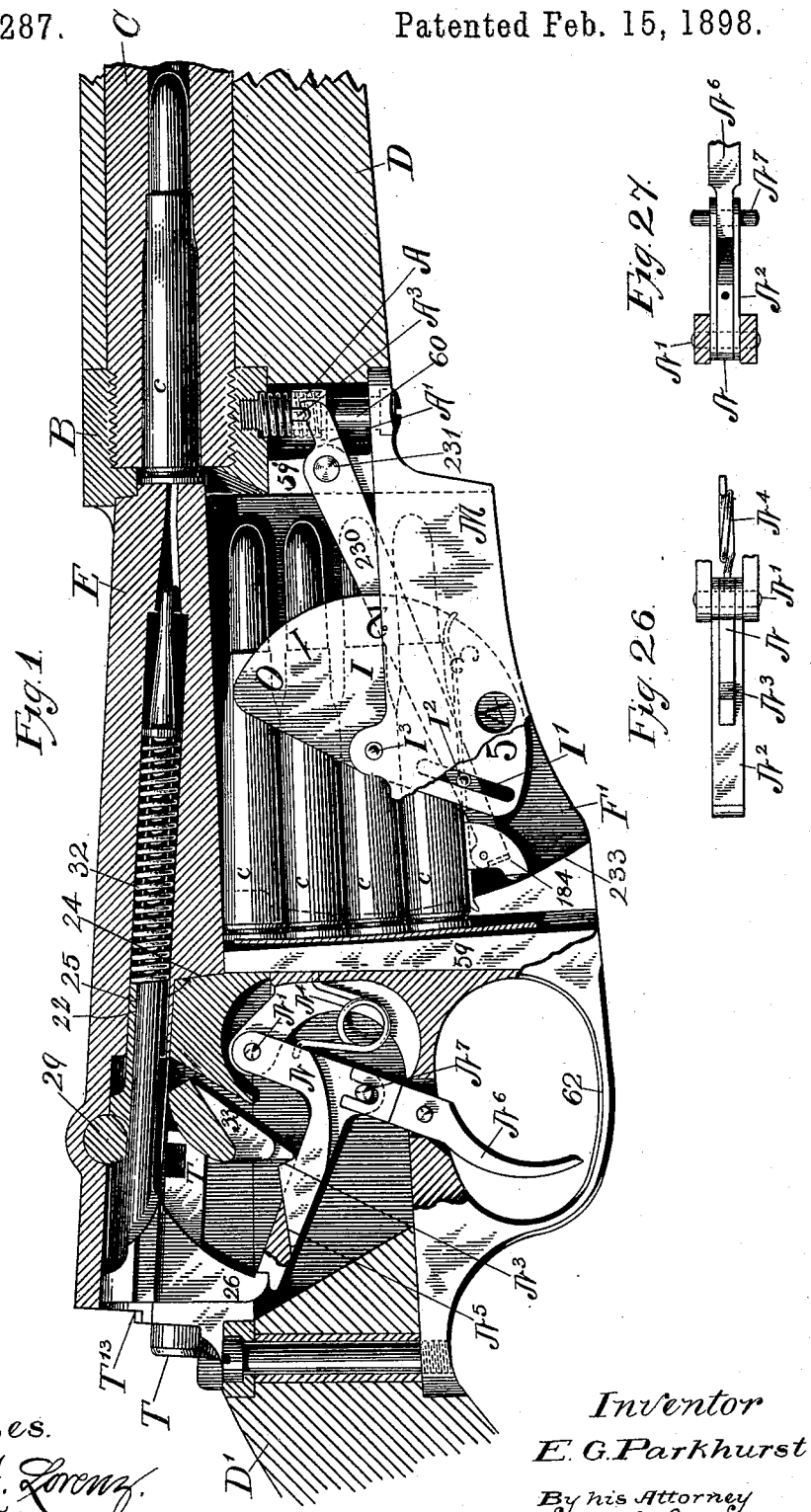

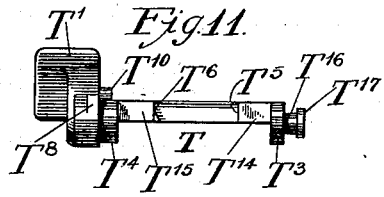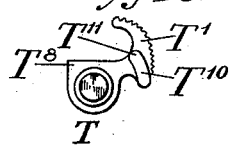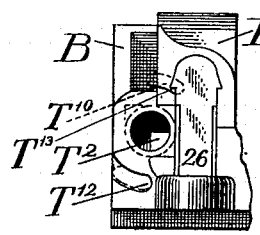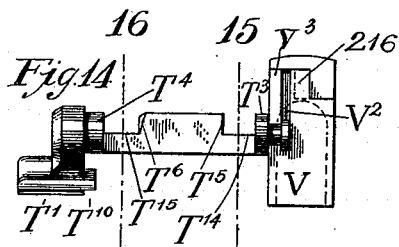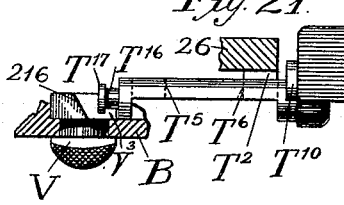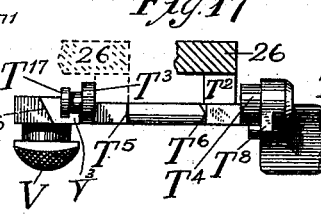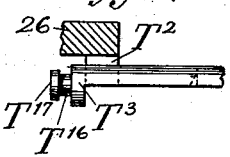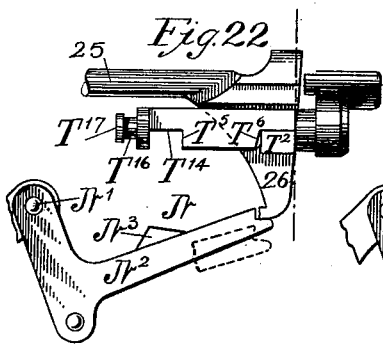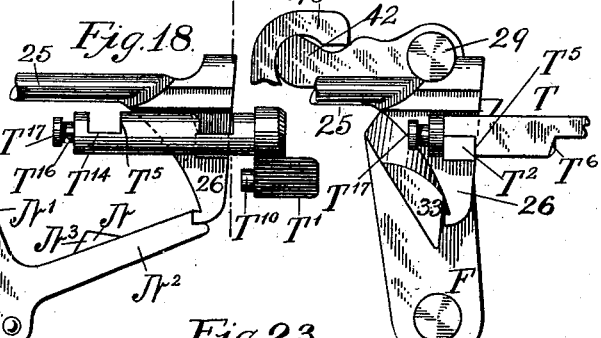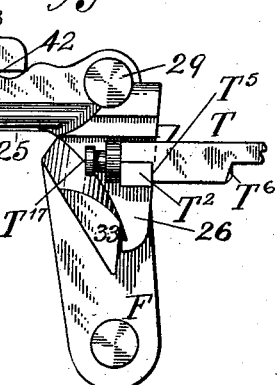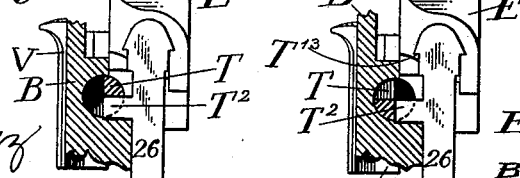

UNITED STATES PATENT OFFICE.

EDWARD G. PARKHURST, OF HARTFORD, CONNECTICUT, ASSIGNOR TO THE LEE ARMS COMPANY, OF CONNECTICUT.

MAGAZINE BOLT-GUN.

SPECIFICATION forming part of Letters Patent No. 599,287, dated February 15, 1898.

Application filed April 20, 1896. Serial No. 588,363. (No model.) Patented in England May 9, 1896, No. 9,925; in France May 13, 1896, No. 256,346; in Belgium May 13, 1896, No. 121,342; in Italy July 6, 1896, LXXXII, 369, and in Austria October 2, 1896, No. 46/3,868.

*To all whom it may concern:*

Be it known that I, EDWARD G. PARKHURST, a citizen of the United States, residing at Hartford, in the county of Hartford and State of Connecticut, have invented certain new and useful Improvements in Magazine Bolt-Guns, of which the following is a full, clear, and exact specification.

This invention relates to improvements in that class of firearms comprising what are known as "bolt-guns." Some of these improvements are in their nature applicable to other types of guns; but they are all herein shown in their application to a firearm similar to that shown and described in Letters Patent of the United States to James P. Lee, No. 547,583, dated October 8, 1895, the devices comprised in my present invention being improvements upon certain features of the firearm therein shown.

This invention is patented in foreign countries as follows: France, No. 256,346, dated May 13, 1896; Belgium, No. 121,342, dated May 13, 1896; Austria, No. 46/3,868, dated October 2, 1896; Italy, No. LXXXII, 369, dated July 6, 1896, and Great Britain, No. 9,925, dated May 9, 1896.

The general object of my invention is to simplify and cheapen the construction and improve the mode of operation of certain features of guns of the class specified, rendering them more convenient and certain in operation. This general object may for convenience be divided into the following specific objects: first, to provide reliable and simple means for actuating the cartridge-elevator; second, to provide an improved visible index by means of which the number of cartridges contained in the magazine may be seen at a glance without the necessity of selecting a certain designated figure from a visible series of figures; third, to provide simple and effective means for locking the actuator-arm of the breech-bolt in its closed position against accidental backward or opening movement thereof, so arranged as to resist the breech-bolt-opening tendency of blows or other impulses acting upon the bolt itself, yet yielding readily to the hand of the operator when applied upon the handle of the bolt-actuator, dispensing with the employment of auxiliary locking devices analogous to the back-lock actuator K of the above-mentioned patent, and therefore dispensing with the necessity of an additional movement on the part of the operator as a preliminary to opening the breech when the parts are in their firing position; fourth, to provide means whereby the firing-pin may be locked in its forward and in its backward position with respect to the breech-bolt while the latter is in its closed position, adapted when locking the firing-pin in its rearward or cocked position to draw the catch of the firing-pin away from the sear, and also serving whether locking the firing-pin at its forward or its rearward position to also lock the breech-bolt with relation to the receiver; fifth, to provide simple and efficient means for performing the several functions of retaining the firing-pin locker endwise to its seat in the receiver, so as to prevent its withdrawal therefrom, and arranged to impose frictional resistance to the rotary movement of the firing-pin locker, so as to retain it in the positions to which it is moved by the operator to operate in conjunction with the extractor X to eject the shell and to form an effective stop for the rearward movement of the breech-bolt, so arranged as to be readily moved aside to allow of the entire withdrawal of the breech-bolt from the receiver.

Figure 1 of the drawings is a right-hand-side view in vertical longitudinal section, showing the breech-bolt mechanism and the firing-pin mechanism in the position occupied by them when the breech-bolt is locked in its extreme forward closed position with the firing-pin retracted in readiness for firing the gun. A portion of the right-hand side of the magazine, with its index, and also the cartridge-elevator, with its actuating means, are shown in their relative positions in front of the section. Fig. 2 is a right-hand-side view of a portion of the cartridge-elevating and cartridge-index mechanisms, showing a single cartridge in the magazine. Fig. 3 is a plan view of a portion of what is shown in Fig. 2, the breech-bolt being omitted. Fig. 4 is a front end view, and Fig. 5 a rear end view, of what is shown in Fig. 2, being projected therefrom. Fig. 6 is a right-hand-side view of a portion of the gun, the receiver and a portion of the sear being broken away so as to show the depressed position of the back lock as the bolt-actuator is drawn back by its handle to open the gun when the parts are in the position shown in Fig. 1. Fig. 7 is a side view, and Fig. 8 a plan view, of a portion of the breech-bolt, the receiver, and the extractor, showing the construction and arrangement of my improved bolt-stop. Fig. 9 is a fragmentary view in section, taken on the line 9 10 of Fig. 7, looking toward the right in that figure, showing my improved bolt-stop in its upper or bolt-stopping position. Fig. 10 is a similar view in section, taken on the same line, showing the bolt-stop pressed to its lowest position to allow of the withdrawal of the breech-bolt from the receiver. Fig. 11 is a plan view of my improved firing-pin locker, while Figs. 12 and 13 are rear and front end views, respectively. Fig. 14 is a side view projected from Fig. 11, while Figs. 15 and 16 are cross-sectional views taken on the lines 15 15 and 16 16, respectively, of Fig. 14. Figs. 17 and 18 are a plan view and a left side view, respectively, of the firing-pin locker shown in its open or unlocked position with relation to the firing-pin, which is therein represented by full lines in its rearward position and by dotted lines in Fig. 17 in its forward position. Figs. 19 and 20 are a plan and a left side view, respectively, of a portion of the firing-pin in its forward position and of its locker turned over into locking relation therewith. The latter view shows also a portion of the bolt-actuator F in order to illustrate how its rearward or opening movement is prevented by locking the firing-pin in its forward position, as shown therein. Figs 21 and 22 are a plan view and a left side view, respectively, of the firing-pin locker in its locking position with relation to the firing-pin, the latter being drawn back clear of its sear, so as to allow of the idle movement of the sear, as represented by dotted lines in Fig. 22. Figs. 23 and 24 are rear end views of the breech-bolt, the firing-pin, a portion of the receiver, and the firing-pin locker, the two latter being shown in cross-section, Fig. 23 representing the firing-pin locker in its open or uncocked position, while Fig. 24 represents it in locking engagement with the firing-pin. Fig. 25 is a similar rear view of the breech-bolt, its firing-pin, and the receiver, the firing-pin locker being omitted therefrom in order to show the parts more clearly. Fig. 26, Sheet 1, is a view of the sear, the back lock, and the sear-spring, looking from above in a direction substantially at right angles with the rearwardly-projecting member of the sear. Fig. 27 is a view projected from Fig. 26, looking from the forward or right-hand side of the parts shown therein. Fig. 28 is a front side view, and Fig. 29 is an underneath view, of the detached bolt-stop and locker-retaining piece.

In the organization of parts shown in the drawings the magazine-frame F', the trigger guard-plate 62, the guard-block 59, the stock D, the barrel C, the receiver B, the bolt E, the breech-bolt actuator F, the firing-pin 25, its spring 32, and the combined extractor and ejector X are in a general way similar in construction, arrangement, and mode of operation to the similarly-designated parts shown in the Lee patent, No. 547,583, above referred to.

The firearm is provided with a magazine (designated in a general way by M) consisting of a mortise running vertically and longitudinally through the receiver, near the forward end thereof, and adapted to receive a packet of cartridges, which are pressed upwardly toward the plane of the bore of the gun by means of a cartridge-elevator consisting of a lifting-arm 230, journaled at its forward end in a bearing 231 in the vertical guard-block 59' of the receiver, and of a follower 184, pivotally mounted at the rearward end of the lifting-lever 230. This follower is provided with rearwardly-projecting arms adapted to engage with cam-faces 233, adjacent to the side walls of the magazine, which cams cooperate with the arms of the follower to hold the latter during its ascending movement in the requisite relation for presenting the upper cartridge to the firing-chamber of the gun, substantially in the manner and for the purpose set forth in the Patent No. 547,583 above referred to.

My improved means for actuating the cartridge-elevator will now be described. The two side members of the lifting-lever 230 are extended forwardly beyond their pivot 231 to form the arms A' A², which extend upon opposite sides of the thimble A. That thimble is located transversely centrally of the magazine and is fitted to slide freely upon the guide-rod 60, which may also serve as a screw to fasten the forward end of the magazine-frame to the receiver. The thimble is provided with laterally-extending wings A³ A⁴, which are notched or grooved on their under sides, as shown in Fig. 4, to receive the arms A' A² of the elevator G, the bottoms of the grooves being rounded, so as to better suit the rolling and sliding contact of the arms therewith. The thimble A is normally pressed toward its lowest positions by means of the spring A⁵, coiled around the screw 60 and abutting against the lower side of the receiver, the tension of the spring being made great enough to elevate the cartridges with sufficient positiveness. The direction of movement of the thimble is tangential with relation to the movement of the arms A' A² upon their pivot 231, thus causing the spring to exert its pressure in a straight line and permitting the use of a simple and inexpensive spiral spring. The nature of the engagement of the wings of the thimble with the arms A' A² prevents the thimble from turning upon the screw while permitting free longitudinal motion thereon.

My improved cartridge-index consists of an approximately semicircular dial I, which is shown to be pivotally mounted upon the right-hand wall 6' of the magazine M. That dial is provided with a slot I', which is engaged by the pin I² on the elevator-lever 230, the movements of the latter as controlled or limited by the cartridges in the magazine being thus utilized to turn the dial I upon its pivot I³. The dial is located close against the inside wall 6' of the magazine, which has an aperture I⁴, as shown in Figs. 1, 2, and 6, the dial being provided with numerals, each so located thereon as to be visible through the aperture I⁴ when the corresponding number of cartridges is contained in the magazine, as illustrated by a comparison of Figs. 1 and 2. A great advantage of this system of indication resides in the fact that the eye of the operator is not confused by having an entire series of numbers or graduations always in sight, as in some of the previously-existing systems. In those systems it is necessary for the operator to direct his eye along the series to the particular figure or graduation indicated by a pointer controlled by the cartridges. In my present system the eye of the operator is always directed to the same point—namely, the aperture I⁴—at which nothing but the correct numeral appears, a single, definite, and correct impression being instantaneously conveyed to the mind of the operator without confusion, hesitation, or error, such as may easily and frequently result from his attempts to distinguish a particular one of a visible series of figures. A further important advantage of this arrangement is in the fact that the parts are all closed within and protected by the framework and magazine-walls of the gun, there being no projecting external levers or pointers connected with the elevator whereby its operation may be interfered with or stopped altogether through becoming bent or clogged by contact with external things—such as dirt, twigs, or blades of grass.

My improved means for locking the actuator-arm, so as to prevent accidental or unintentional opening of the breech-bolt from its closed position shown in Fig. 1, is best represented in that figure and in Figs. 6, 26, and 27. The sear N² is pivotally mounted at N' to a convenient lug upon the frame, the rearwardly-extending sear-arm being adapted to engage with the catch 27 of the firing-pin in a manner similar to that of the corresponding parts in the Lee patent above referred to. The forward portion of the sear N² is divided longitudinally into two side members, between which is located the hook or back lock N for the actuator-arm 33. This hook is also mounted upon the pivot at N', and its movements are therefore concentric with those of the sear N². The rearward end N⁵ of the hook N is fitted to bear against the bottom of the slot which divides the sear, and the portion N⁵ of the hook is normally pressed into contact therewith by means of the spring N⁴, one end of which engages with the hook and the other end with a portion of the frame or fixed adjacent portion of the receiver. The operation of the spring N⁴ tends to normally hold the portion N⁵ of the hook to its seat in the sear, thereby also pressing the rearwardly-extending sear-arm upwardly against the catch 27 of the firing-pin. The trigger N⁶ is pivoted in the usual way upon the receiver, and its upper portion is fitted into the longitudinal slot in the lower portion of the sear, being operatively connected therewith by means of the pin N⁷. The spring N⁴ is thus made to effectively serve the hook, the sear, and the trigger.

The actuator-arm-engaging face N³ of the hook N is preferably made substantially at right angles to a line running therefrom to the pivot N' of the hook, and this face of the hook is made to engage the rearward side of the actuator-arm, as shown in Fig. 1, when the other parts are in the position shown therein. The breech-bolt cannot be unlocked from the closed or firing position (shown in Fig. 1) without moving that actuator-arm rearwardly, and that rearward movement of the actuator-arm is herein prevented by means of the hook N of my present invention with a sufficient degree of certainty to counteract the accidental jars or blows to which the firearm may be subjected in handling.

When it is desired to retract the breech-bolt of the gun, sufficient pressure is applied to the actuator-handle by the hand of the operator to cause the actuator-arm 33 to ride over and depress the hook N against the tension of its spring, as shown in Fig. 6, from which position the opening movement of the bolt-actuator and breech-bolt is continued exactly as shown in the Lee patent referred to, the hook returning again to the position shown in Fig. 1 after the bolt-actuator has passed by, thus resuming its pressure upon the sear.

In the operation of closing the breech-bolt the actuator-arm rides over and depresses the hook N from its rearwad side, the parts again assuming the relative position shown in Fig. 1. The hand of the operator applied upon the actuator-handle has the advantage of increased leverage over the resistance of the hook to the movement of the actuator-arm 33. The operator is thus enabled to easily overcome a pressure of the spring N⁴ sufficient to resist the breech-opening tendency of shocks due to the manipulation of the firearm, which act directly upon the actuator-arm and its hook. It is obvious that the hook N is equally effective in its detaining operation upon the actuator-arm whether the firing-pin is in its cocked position in engagement with the sear, as shown in Figs. 1 and 6, or whether the firing-pin is in its forward or discharged position.

As a means of locking the firing-pin both in its discharged and in its cocked positions and for retracting it from its cocked position, (shown in Fig. 1,) so as to move out of engagement with the sear and thus prevent the accidental discharge of the gun, I have provided a firing-pin retracting and locking device, (designated in a general way by T.) This locking device is so arranged relatively to the firing-pin and to the breech-bolt as to lock the latter in its closed position with relation to the receiver whether the firing-pin is in its cocked or its discharged position relatively to the breech-bolt.

My improved means for locking the firing-pin with relation to the breech-bolt when the latter is in the closed position (shown in Figs. 1 and 6) may best be seen by a reference to Figs. 12 to 25, inclusive. The firing-pin locker T is provided with a thumb-piece T', which projects rearwardly of the receiver, as shown in Figs. 1, 8, and 9, so as to be conveniently reached by the thumb of the operator, and a cylindrical extension of the thumb-piece T'', preferably integral therewith, is fitted in a cylindrical bore in the rearward end of the receiver, located adjacent to and parallel with the firing-pin, when the breech-bolt is in its locked position, as shown in Figs. 1 and 6. The arm 26 of the firing-pin 25 is provided with a locking-lug $T^2$, which extends into and occupies the lower right-hand quadrant of the circle representing the cylindrical bore for the seat of the firing-pin locker, as shown in Figs. 23, 24, and 25. One-half of the cylindrical portion of the firing-pin locker T is cut away longitudinally to a plane passing through the axis thereof, as shown in Figs. 11, 17, and 21, leaving the cylindrical portions $T^3$ and $T^4$ intact to form the bearings on which the locker turns in the receiver, the semicylindrical portion being thus cut away for the purpose of permitting the necessary longitudinal movement of the lug $T^2$ of the firing-pin with relation to its breech-bolt, as represented in Fig. 17, when the locker is in its unlocked position shown in that figure. Portions of the remaining semicylindrical portion of the firing-pin locker are cut away to form the forwardly-facing shoulder $T^5$ and the rearwardly-facing shoulder $T^6$, respectively, forming recesses adjacent to those shoulders of a sufficient width to receive the lug $T^2$ on the firing-pin arm 26 when the locker is turned to its locking position, the shoulder $T^5$ being located in a position suitable for locking the firing-pin lug in its forward position, (shown in Figs. 19 and 20,) while the shoulder $T^6$ is located in a position suitable for locking the firing-pin in its rearward position, as shown in Figs. 21 and 22.

It should be observed that it is not considered sufficiently safe to lock the firing-pin in the position shown in Fig. 1 without slightly retracting it from the sear, as shown in Fig. 22. If the firing-pin were to be locked while held by the sear, as shown in Fig. 1, and if the sear were then moved away by the accidental or inadvertent pulling of the trigger, the firing-pin would be liable to settle forward slightly, so that the sear could not return to its previous position to again engage with and support the catch of the firing-pin. The gun would therefore be prematurely discharged by the operation of releasing the firing-pin from its safety-locker. To obviate this danger, I have arranged the parts as herein described, so as to transfer the tension of the firing-pin wholly from the sear to the firing-pin locker, so that if the sear should be moved away by the accidental or inadvertent pulling of the trigger it will return without hindrance to its full-line position (shown in Fig. 22) ready for engagement with the catch of the firing-pin when the latter is released by the turning back of its safety-locker. As a means of thus retracting the firing-pin the shoulder $T^6$ is beveled, as best shown in Figs. 11, 14, and 17, so as to enable the locker in turning from the position shown in Fig. 17 to that shown in Fig. 21 to cam the firing-pin rearwardly to an extent best seen by comparison of Figs. 18 and 22, so as to allow the sear $N^2$ and its hook N to move freely back and forth from the full-line position to the dotted position indicated in Fig. 22.

The distance apart of the two shoulders $T^5$ and $T^6$ is made to suit the extent to which the firing-pin is moved with relation to its breech-bolt in the operation of cocking and discharging the piece, that extent of movement being shown by a comparison of the dotted-line position and the full-line position of the firing-pin and its lug $T^2$. (Shown in Fig. 17.) The additional backward movement of the firing-pin from the position shown in that figure to that shown in Figs. 21 and 22 is for the purpose of transferring the tension of the firing-pin spring from the sear $N^2$ to the firing-pin locker T, so as to allow idle movement of the sear and its trigger for purposes of safety, as above described.

By reference to Fig. 20 it will be seen that the firing-pin when locked in its forward position, as shown in that figure, serves also to lock the breech-bolt to place, since the actuator-arm 33, by means of which the breech-bolt is opened, is prevented from backward or bolt-opening movement by the depending arm 26 of the locked firing-pin.

The operation of locking and unlocking the firing-pin, whether in its forward or its rearward position, is performed by turning the firing-pin locker T substantially through half a rotation upon its bearings $T^3$ and $T^4$ in the receiver from the position shown in Figs. 17, 18, and 23 to that shown in Figs. 21, 22, and 24, and this extent of rotary motion toward its locking position is established by means of the stop $T^8$, which collides with the shoulder $T^9$ on the receiver, (best shown in Figs.

1, 6, and 25,) while the rotary movement of the lock toward its unlocking position is regulated by means of the end $T^{11}$ of the locking-rib $T^{10}$ against the bottom of the recess $T^{12}$ in the receiver.

In addition to performing the function of locking the firing-pin against longitudinal movement the firing-pin lock T is also utilized to lock the breech-bolt of the gun in its closed or firing position by means of the bottom walls $T^{14}$ $T^{15}$ of the recesses adjacent to the shoulders $T^5$ $T^6$, respectively. Inasmuch as the firing-pin is so mounted in the breech-bolt as to be capable only of longitudinal movement with relation thereto, it follows that the locking of the firing-pin against transverse movement relative to the receiver would also operate to similarly lock the breech-bolt, it being necessary to raise the breech-bolt in order to disengage the stop-abutment 22 and the recoil-abutment 24 as a preliminary to retracting the breech-bolt to its open position. Therefore when the firing-pin locker is turned to its locking position the upper surface of the lug $T^2$ on the firing-pin arm 26 is engaged by the wall $T^{14}$ of the locker, as shown in Figs. 19 and 20, when the firing-pin is in its forward position, and by the wall $T^{15}$ when the firing-pin is in its backward or retracted position, as shown in Figs. 21 and 22. As the upper surface of the lug $T^2$ is located in a radial relation to the axis of the firing-pin locker T it follows that the walls $T^{14}$ and $T^{15}$, which are also located in a radial relation to that axis, will coincide therewith when turned to the locked position, as best shown in Fig. 24. As the upper surface of the lug $T^2$ extends to the axis of the locker T the upward movement of the lug necessary to open the breech-bolt has practically no tendency to turn back the locker, which therefore imposes a sufficiently positive lock against upward or opening movement of the firing-pin, and consequently of the breech-bolt upon which the pin is mounted. Although this locking of the breech-bolt against lateral movement by means of its firing-pin is considered to be reasonably safe under ordinary circumstances, I deem it highly important to provide additional and more positive means of locking the breech-bolt directly to the receiver, thereby preventing the initial vertical movement of the breech-bolt necessary to raise the recoil-abutment 24 clear of the stop-abutment 22. When guns of this class (shown in the Lee patents) were first devised, it was supposed that the recoil and stop abutments 22 and 24 would be sufficient to prevent accidental opening of the breech-bolt, but it was found in practice that the breech-bolt would be occasionally opened by the jar or concussion due to accidentally striking the butt of the gun against any object or in bringing it sharply to the ground in going through the manual of arms. I therefore provide a shoulder $T^{13}$ at the rearward end of the breech-bolt, over which the locking-rib $T^{10}$ of the locker is adapted to pass, as shown by dotted lines in Fig. 25, when the locker is moved to its locking position. The rib $T^{10}$ is fitted tightly over the shoulder $T^{13}$ of the breech-bolt, thus operating not only to lock the breech-bolt firmly to place in the receiver, but also reacting upon the locker itself to hold it in its locked position by frictional contact. This direct means of locking the breech-bolt against lateral movement may be employed independently of the other portion thereof, which is herein shown for locking the firing-pin, by mounting it in the breech-bolt on the right-hand side of the firing-pin or elsewhere, as may be convenient; but I prefer to combine them in a single integral device, as herein shown, thereby simplifying the construction of the parts and simplifying also the manipulation of the firearm.

In a contemporaneously pending application, Serial No. 591,928, filed May 18, 1896, I have shown, described, and claimed another form of locker for locking the breech-bolt laterally to the receiver, the said locker being also adapted, although in a different way, to engage with and lock the firing-pin when the latter is in its rearward position; but I do not therein claim, broadly, as in the present application, in combination with the receiver and with the breech-bolt, a locker therefor mounted on one and engaging with the other, whereby they are locked together against lateral movement for the purpose specified.

As a means of retaining the firing-pin locker endwise in its seat in the receiver I have provided a simple device which also serves as a stop for the rearward movement of the breech-bolt when in operation and which may readily be depressed, so as to enable the breech-bolt to be withdrawn from the receiver in the operation of disassembling. This combined bolt-stop and firing-pin locker retaining-piece is preferably formed in an integral piece V, which is fitted to slide in the left-hand wall of the receiver, as shown in Figs. 7, 8, 9, and 10, and is provided with a spring V', which rests upon a seat made in the stock of the gun and normally presses the stop upward to the bolt-stopping position shown in Figs. 7 and 9. The upper end of the breech-bolt is preferably checked or knurled for the thumb of the operator and is provided at its rearward side with an inclined cam-face 216, corresponding to the similarly shaped and designated cam of the stop-abutment S of the Lee patent, No. 547,583, above referred to, and this portion of my improved bolt-stop performs exactly the same functions that are performed by the corresponding parts shown in that patent, which are to stop the rearward movement of the breech-bolt and to throw the rearward end of the extractor abruptly endwise, causing its forward end to be thrown inward and thus serving to eject the cartridge-shell.

The position of the bolt-stop in which it performs the functions just described is that shown in Figs. 7 and 9, to which it is normally pressed by the operation of its spring V', being thus held within the path of movement of the extractor, as shown in those figures. By depressing the bolt-stop against the pressure of its spring, as shown in Fig. 10, the operator may carry the extractor-engaging abutment or cam 216 of the bolt-stop below the path of movement of the extractor, so as to enable the breech-bolt and its extractor to be withdrawn rearwardly from the receiver. In order to replace the breech-bolt in the receiver, it is only necessary to press the bolt-stop downward again to the position shown in Fig. 10 until the extractor is carried past that bolt-stop, when it again resumes the position shown in Figs. 7 and 9.

As a means of retaining the firing-pin locker endwise to position in its cylindrical seat in the receiver the forward end of the locker is provided with an annular groove $T^{16}$, leaving an annular rim or head $T^{17}$, which is located adjacent to and adapted to engage with a rib $V^3$ upon the inside of the bolt-stop V. This rib and its adjacent groove or recess $V^2$ are preferably made by a milling-cutter of the form of the forward end of the firing-pin locker and extend from the upper end of the bolt-stop far enough to allow of the necessary movement of the latter, as represented in Figs. 9 and 10, the cut terminating with a rounded recess, as shown in the latter figure, which when the bolt-stop is pushed up by its spring V' presses against the groove $T^{16}$ and the head $T^{17}$ of the firing-pin locker. The latter is thus made to limit the upward movement of the bolt-stop, while the pressure of the bolt-stop against the locker offers a sufficient frictional resistance to the rotary movement of the firing-pin locker, and thus serves to hold the latter in the two positions to which it is moved by the operator. It would be unnecessary, besides being difficult in practice, to make both the rib $V^3$ and the groove or recess $V^2$ bear laterally against the locker, and it is also obviously unnecessary to make the groove $V^2$ of the same width as the annular head $T^{17}$ of the locker.

In assembling the firing-pin locker and the bolt-stop to position on the receiver the firing-pin locker is first pushed fully into its cylindrical seat in the receiver, then the bolt-stop is pushed upward from below, the spring V' is placed in position, and the stock D' is then applied on the receiver, thus serving to hold the bolt-stop to position by affording a resting-place or abutment for the lower end of the spring, a recess being made in the stock for this purpose, as shown in Fig. 7, which may, if desired, be fitted with a metallic thimble to receive the end of the spring.

It is not an essential feature of this invention that the locking portion of the locker should be a mutilated cylinder. Various modified forms thereof may be provided with locking-shoulders adapted to be moved by the rotation of the locker into engaging relation to the firing-pin; but I prefer the form shown, as being simple and easily and cheaply manufactured.

The radial faces of the quadrant-shaped portions of the locker (shown in cross-section in Figs. 15 and 16) might be adapted to serve as stops for the two positions of the locker against the corresponding faces of the lug $T^2$ of the firing-pin only when the breech-bolt is in its closed position; but in order to provide the locker with stops which will remain in constant relation to it I have arranged the stop $T^8$ and the locking-rib $T^{10}$, and their coacting shoulders on the receiver, to serve as stops for this purpose.

The resistance of the back lock N to the movement of the actuator-arm may best be varied by altering the angle of the hook $N^3$ with relation to the direction of movement of the actuator-arm.

It is not essential that the pivots of the sear and the back lock shall be exactly coincident. The latter may be pivoted upon the sear at any convenient point thereof which allows of a suitable movement of the back lock relative to the actuator-arm. In many analogous ways the details of this invention may be modified without departing from or exceeding a reasonable interpretation of its intended scope.

I claim as my invention—

1. In a firearm-magazine, in combination with the pivotally-mounted cartridge-elevator thereof, a thimble mounted adjacent to the pivot and adapted to move in a tangential relation thereto, provided with oppositely-extending lateral wings for engaging with the elevator.

2. In a firearm-magazine, in combination with the pivotally-mounted cartridge-elevator thereof, a thimble provided with oppositely-extending lateral wings for engaging with the elevator, and a guiding-rod for the thimble arranged in tangential relation to the cartridge-elevator.

3. In a firearm-magazine, in combination with the pivotally-mounted cartridge-elevator thereof, provided with a bifurcated arm extending from the pivot, a tangentially-moving thimble located between the bifurcations of the arm, provided with oppositely-extending lateral wings engaging with the bifurcations, and a tangentially-arranged spring for actuating the elevator through the medium of the thimble.

4. In a firearm-magazine, in combination with the pivotally-mounted cartridge-elevator thereof, provided with a bifurcated arm extending from the pivot, a tangentially-moving thimble located between the bifurcations of the arm, provided with oppositely-extending lateral wings which are notched to receive the bifurcated members of the elevator-arm, whereby rotary movement of the thimble is prevented, and a tangentially-arranged spring for actuating the elevator through the medium of the thimble, substantially as described.

5. In a firearm-magazine, in combination with the side wall thereof, provided with a sight-aperture for the purpose specified, and with the cartridge-elevator thereof, a cartridge-indicating dial consisting of a flat disk pivotally mounted upon the inner side of the side wall, having a series of numerals so located thereon as to be capable of being brought singly into coincidence with the aperture, and having a slot engaged by a pin located on the cartridge-elevator, whereby the dial is moved so as to expose to view the numeral corresponding to the number of cartridges contained in the magazine.

6. In a firearm, in combination with the firing-pin and with the actuator-arm, a combined sear and back lock, the latter being located between bifurcations of the sear, and pivotally mounted at a point substantially concentric with the pivot of the sear, the back lock being provided with a stop abutting against the sear, and provided with an actuator-arm engaging portion, and a spring operatively connected with the back lock so as to press the latter to its seat in the sear, whereby the sear and the back lock are both pressed into operative relation with the firing-pin and with the actuator-arm respectively, by the operation of the single spring.

7. In a firearm, in combination with the firing-pin and with the actuator-arm, the hereindescribed combination of sear, trigger, back lock, and a spring, the sear and the trigger being pivotally mounted upon the firearm and operatively connected, the back lock being located between bifurcations of the sear and pivoted substantially concentric therewith, and having a stop portion abutting against the sear and limiting its movement with relation thereto, the spring operating to press the back lock to its seat in the sear, serving as the only spring for the sear, the back lock and the trigger.

8. In a firearm of the class specified, in combination with the firing-pin thereof, a locker therefor mounted to oscillate upon bearings, having a locking-shoulder located at each of the desired locking positions of the firing-pin, and movable into locking engagement therewith at the desired locking positions by turning the locker upon its bearings, substantially as described.

9. A firing-pin locker, consisting of a mutilated cylindrical pin cut away on a plane passing through the axis thereof to an extent sufficient to allow of the operative longitudinal movement of the firing-pin, the remaining semicylindrical portion of the locker being cut away sufficiently to form locking-shoulders at the two extremes of movement of the firing-pin.

10. A firing-pin locker provided with a thumb-piece adapted to be engaged by the operator, and with a cylindrical extension located adjacent to the path of movement of the firing-pin, one half of the cylindrical portion of the locker being cut away longitudinally to a plane passing through the axis thereof for a length suited to the extent of longitudinal movement of the firing-pin, the remaining semicylindrical portion being cut away at the ends of movement of the firing-pin sufficiently to form locking-shoulders therefor.

11. In a firearm of the class specified, provided with a receiver, and with a breech-bolt opening therefrom by a preliminary vertical bodily movement at its rearward end, a firing-pin mounted thereon, and a bolt-actuator for simultaneously retracting the firing-pin and imparting the preliminary vertical opening movement of the bolt, a locker located adjacent to the firing-pin and provided with a locking-shoulder movable into engagement with the firing-pin when the latter is in its forward position, whereby both the firing-pin and the breech-bolt are locked in their forward position against their initial retracting and opening movements respectively.

12. In a firearm of the class specified, in combination with the firing-pin and the locker-sear thereof, an oscillating safety-locker journaled adjacent to, and substantially parallel with, the firing-pin, the locker being provided with a shoulder arranged to be moved by its oscillation into engagement with the firing-pin when the latter is in its cocked position, one of their engaging surfaces being inclined so as to retract the firing-pin from the sear, with means for retaining the locker in the position in which it holds the firing-pin in its retracted position with relation to the sear, substantially as described.

13. In a firearm, in combination with the receiver and with the firing-pin, the latter being provided with a locking-lug, a locker for the firing-pin journaled in the receiver adjacent to and substantially parallel with the path of movement of the locking-lug, the locker being provided with shoulders arranged and operating by the oscillation of the locker to move into engaging relation to the lug, and adapted respectively to lock it in its forward or in its backward position, the shoulder for the latter position having an inclined face for retracting the pin, for the purpose specified.

14. In a firearm, in combination with the receiver, and with the firing-pin, provided with a locking-lug, a locker for the firing-pin journaled in the receiver adjacent to and substantially parallel with the path of movement of the locking-lug, the lug extending substantially to the axis of oscillation of the locker, and the latter being cut away longitudinally to a plane passing through its axis for a length sufficient to allow of the longitudinal movement of the lug, the remaining portion of the locker being provided with shoulders arranged and operating to be moved by the oscillation of the locker into the path of movement of the firing-pin lug.

15. In a firearm, in combination with the receiver, and with the firing-pin, provided with a locking-lug, a locker for the firing-pin, journaled in the reciver adjacent to and substantially parallel with the path of movement of the locking-lug, the lug extending substantially to the axis of the locker, and the latter being cut away longitudinally to a plane passing through its axis for a sufficient length to allow of the longitudinal movement of the lug, the remaining portion of the locker being provided with shoulders arranged and operating to be moved by the oscillation of the locker into the path of movement of the firing-pin lug, the shoulder for locking the firing-pin in its rearward position being inclined so as to slightly retract the pin, for the purpose specified.

16. In a firearm, in combination with the receiver, and with the firing-pin, provided with a locking-lug, a locker for the firing-pin having a cylindrical portion journaled in a corresponding seat in the receiver located adjacent to and substantially parallel with the path of movement of the locking-lug, the latter extending substantially to the axis of the cylindrical seat for the locker and occupying substantially a quadrant of the circle representing a cross-section thereof, and the locker being cut away longitudinally to a plane passing through its axis for a length sufficient to allow of the necessary operative longitudinal movement of the lug, the remaining semi-cylindrical portions of the locker being cut away on radial lines to form locking-recesses at the desired locking positions of the lug, the radial face of the bottom of the recess being brought down upon the upper surface of the lug by the oscillation of the locker to its locking position, whereby the firing-pin and its breech-bolt are locked against transverse movement.

17. In a firearm, in combination with the receiver thereof, the herein-described combined breech-bolt stop and firing-pin locker-retaining device, fitted upon the receiver and provided with means forming an end bearing for the locker so as to retain it against withdrawal.

18. In a firearm, in combination with the receiver thereof, the herein-described combined breech-bolt stop and firing-pin locker-retaining device, fitted upon the receiver and movable into and out of stopping relation to the breech-bolt, and provided with means forming an end bearing for the locker, whereby the latter is retained against withdrawal.

19. In a firearm of the class specified, in combination with the receiver, the breech-bolt and the firing-pin locker, a combined bolt-stop and locker-retaining device mounted upon the receiver and provided with a bolt-stopping portion, and with a rib for retaining the locker against withdrawal, the retaining-rib being extended to allow the breech-bolt to be disengaged from the receiver without disengaging the locker therefrom.

20. In a firearm of the class specified, in combination with the receiver, the breech-bolt, and the firing-pin locker, a combined bolt-stop and locker-retaining device mounted upon the receiver and provided with a breech-bolt-stopping portion, with means for retaining the locker against withdrawal, and a spring normally holding the device in its bolt-stopping position.

21. In a firearm of the class specified, in combination with the receiver, the cartridge-ejector, the breech-bolt, and a firing-pin locker, a combined breech-bolt stop and locker-retaining device, mounted to slide upon the receiver transversely to the direction of movement of the bolt, provided with an inclined portion for operating the ejector and stopping the bolt, and provided with means for retaining the locker against withdrawal, with a spring for normally holding the device to its bolt-stopping position.

22. In combination with the receiver and with the firing-pin thereof, a firing-pin locker journaled in the receiver and provided with an endwise-retaining bearing, a retaining device for the locker, mounted upon the receiver transversely to the position of the locker, and a spring for pressing the retaining device into frictional contact with the locker so as to offer a suitable degree of frictional resistance to the oscillation of the locker.

E. G. PARKHURST.

Witnesses:
WILLIAM A. LORENZ,
W. H. HONISS.